350-96.24 SR

XR 3,706,134

SEARCH ROOM

United States Patent

[15] 3,706,134

[45] Dec. 19, 1972

Sweeney et al.

SUBSTITUTE FOR MISSING XR

[54] OPTICAL AID

[72] Inventors: Joseph Patrick Sweeney, Harrisburg; Herman Rueger, Lancaster, both of Pa.

[73] Assignee: AMP Incorporation, Harrisburg, Pa.

[22] Filed: Aug. 4, 1970

[21] Appl. No.: 60,941

Related U.S. Application Data

[63] Continuation of Ser. No. 672,917, Oct. 5, 1967, abandoned.

[52] U.S. Cl.......................29/629, 29/624, 29/203 B, 29/407, 29/203 MW

[51] Int. Cl...............................................H02g 15/00

[58] Field of Search.........29/203, 629, 626, 624, 407

[56] References Cited

UNITED STATES PATENTS 3,052,842 9/1962 Frohman et al..................29/407 UX 3,169,305 2/1965 Gray..................................29/407 X 3,372,455 3/1968 Howie..................................29/626

*Primary Examiner*—Richard J. Herbst
*Assistant Examiner*—Robert W. Church
*Attorney*—Curtis, Morris and Safford, Marshall M. Holcombe, William Hintze, William J. Keating, Frederick W. Raring, John R. Hopkins, Adrian J. LaRue and Jay L. Leitchek

[57] ABSTRACT

An optical aid is disclosed in several embodiments employing fiber optic cable to transmit light to the side of desired insertion of an electrical lead to better and more quickly identify said site thereby achieving cost savings and greater reliability in harness making. Embodiments are included wherein the optical aid may be programmed to provide a program wiring technique.

4 Claims, 11 Drawing Figures

INVENTOR
JOSEPH PATRICK SWEENEY
HERMAN RUEGER

BY John R. Hopkins

INVENTOR
JOSEPH PATRICK SWEENEY
BY HERMAN RUEGER
John R Hopkins

INVENTOR.
JOSEPH PATRICK SWEENEY
BY HERMAN RUEGER

INVENTOR
JOSEPH PATRICK SWEENEY
BY HERMAN RUEGER
John R. Hopkins

INVENTOR
JOSEPH PATRICK SWEENEY
HERMAN RUEGER
BY John R. Hopkins

OPTICAL AID

This application is a continuation of Ser. No. 672,917, filed Oct. 5, 1967, now abandoned.

BACKGROUND OF THE INVENTION

Not long ago a "complex" harness comprised several dozen leads of 20 AWG size wire extended between terminal blocks several inches in minimum width containing identifying symbols ¼ inch in height. The earlier "complex" harness might have included three or four branches each containing one or several leads for other terminations. The average harness fabricator needs little more than the ability to recognize alphanumeric symbols and in many instances colors in order to do an adequate job. Today many such harnesses are still being made, but a typical complex harness includes several hundred leads of less than half the size of the earlier lead terminated by connectors or terminals ⅛ or 1/16 of an inch in diameter fitted into terminal block or connector apertures and recesses of said size carrying identifying symbols frequently 1/32 or perhaps as small as 1/64 of an inch in height. Frequently the symbols are of the same material as that of the block or connector with almost no contrast to aid in symbol identification. The complex harness may have several branches each having a dozen or several dozen of the smaller leads which have to be terminated in even smaller connectors and blocks.

The transition in technique of harness making has gone from one where a fabricator may within 15 or 20 minutes complete a harness utilizing readily identifiable symbols to one wherein the fabricator must spend many hours on a single harness and rely upon some sort of aid to enable proper identification of symbols or connectors and blocks. This transition has included the use of an enlarged layout of the harness identifying the connectors in a manner facilitating a comparative coordinate technique wherein the fabricator identifies a given aperture or recess by counting down and over on the blow-up and then counting down and over on the actual connector or block to complete insertion of a particular lead. With respect to the development of even more complex harnesses of smaller size for large production harnesses the drawing blow-up has at times been replaced by some sort of lamp board which is sequentially energized to better identify the particular insertion step. The comparative count down and count over scheme is nevertheless still employed. While fabricators have developed particular skills in utilizing the foregoing technique the tedious nature of the work with resulting errors and rework has generally limited improvement in harness making. In part this is tied to physical limitations of the fabricator, limitations based upon manual dexterity, the ability to visually perceive extremely small and noncontrasted symbols and resulting psychological factors aggravated by an increased time span in making up a given harness.

One of the more recent developments in harness making aid employs a dummy connector half wired up to a lamp panel and arranged so that a connector half may be plugged therein which has been indiscriminately filled with terminating leads. A circuit is provided which is completed by grounding or energizing the other terminal of the lead causing an associated lamp to be lighted. The fabricator using the comparative count down and over approach then inserts the selected lead in the other connector half. This process is continued until the harness is made. The technique used is nevertheless still subject to a requirement for seeing extremely small symbols and a reliance upon comparative and counting skills which are difficult to maintain on a sustained basis.

The foregoing problems are also present with respect to wiring matrices comprised of terminal posts or the like. One of the prior art approaches to the problem is to utilize a rather complicated and expensive automatic machine which can apply wires to posts responsive to some kind of tape recorded program. Machines of this type are frequently termed X–Y machines and are utilized to apply wrapped turns of a stripped wire in a manner referred to as Wire-Wrap or to apply clips which hold a wire to a post and are called TERMI-POINT machines. In many instances, however, the number of units to be wired is not sufficient to warrant the purchase or lease of such machines or even the set-up time required to program such machines if one is available.

In general the problem of placing very small parts in or on a specific and identified point is one that is not fully answered by automation to eliminate the limitations inherent in manual labor.

SUMMARY OF THE INVENTION

This invention relates generally to a means and method of aiding one engaged in the manual task of placing large numbers of very small parts in specific locations. The invention relates particularly to an optical aid for use in making electrical harnesses or in wiring circuits and the like.

It is an object of the invention to provide an improved technique and devices for reducing the cost and eliminating error in manual tasks calling for placement of series of very small parts in specific locations. It is a further object to provide an improved technique and means for reducing the time required in eliminating the tenacious nature of present day harness making and complex circuit wiring. It is still another object of the invention to provide an optical aid which facilitates the identification of parts to be installed or inserted and the site of installation or insertion wherein the small size and large number of parts poses a limitation on human skills. It is yet another object of the invention to improve reliability by eliminating error in harness making and wiring arts through the provision of a programmable light guide apparatus.

The invention overcomes the problems referred to relative to the background of the invention and achieves the foregoing objectives by transmitting light through fiber optic cables to the site of installation or insertion of a part so that a fabricator can quickly and accurately complete installation or insertion of such part. A light source and a mechanism for mounting and/or moving such source is provided to facilitate programming of a light guide matrix for production of one or a large number of fabrication stations. In certain embodiments a guiding and identifying light is developed for one-half of a harness or wiring pattern the other half being previously wired without reference to identifying symbols. In another embodiment a guiding light source is developed for each of two or more sights upon installation or insertion. In still another embodiment auxiliary lights are utilized to guide the layout of wire between sites of installation or insertion. In several embodiments means are provided to move a single light source sequentially in a controlled manner relative to a large number of fiber optic bundles which are, in turn, arranged in patterns between the different sites of installation or insertion. In accordance with the invention the site of installation or insertion is indicated to an extent readily visible to a fabricator and the light transmitted from a source is removed only when proper installation or insertion is completed. Fabricating time is reduced and error is accordingly minimized thus improving the overall reliability of harnesses and circuit wiring patterns.

In the drawings:

FIG. 1*a* is a perspective view of the rear of a multiple connector which must be wired with leads to form a harness;

FIG. 1*b* is an enlargement of the corner portion of the connector shown in FIG. 1*a;*

DESCRIPTION OF PREFERRED EMBODIMENT OF THE INVENTION

Figure 1A:
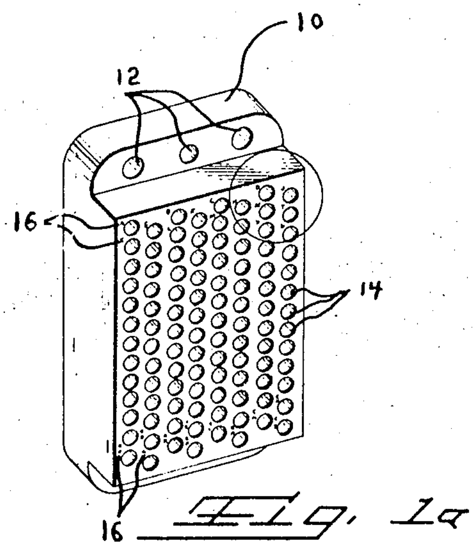
Figure 1B:
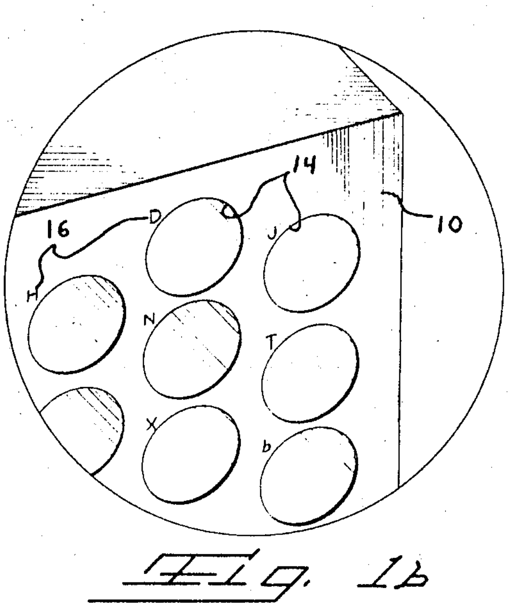

Referring now to FIG. 1a the block shown as 10 is approximately to scale and represents a connector half of the type of connector used in large quantities to interconnect computer components. The three holes 12 at the top of the view of the block 10 are mounting holes. The view in FIG. 1a is from the rear of the connector and the connector shown is adapted to be loaded with contacts or terminals from the rear which latch in the connector block upon insertion. Contacts or terminals terminated to leads are inserted in all or at least most of the apertures identified as 14. Each of the apertures is labeled with a symbol in the manner shown in FIG. 1b representing an enlargement of the corner of the block 10. It is the identification of this symbol that forms a considerable problem in harness making. This identification is necessary because each of the leads between two connector halves like that shown defines a circuit path as part of an overall circuit having a given function and comprised of a large number of subcomponents and elements. The symbols shown in FIGS. 1*a* and 1*b* as 16, in addition to being quite small and difficult to discern, are frequently formed by projections or indentations in the block material without other contrast. Thus, if the block material is of a typical black phenolic or a dark blue diallyl phthalate, the lack of contrast adds to the problem of identification.

Figure 2:
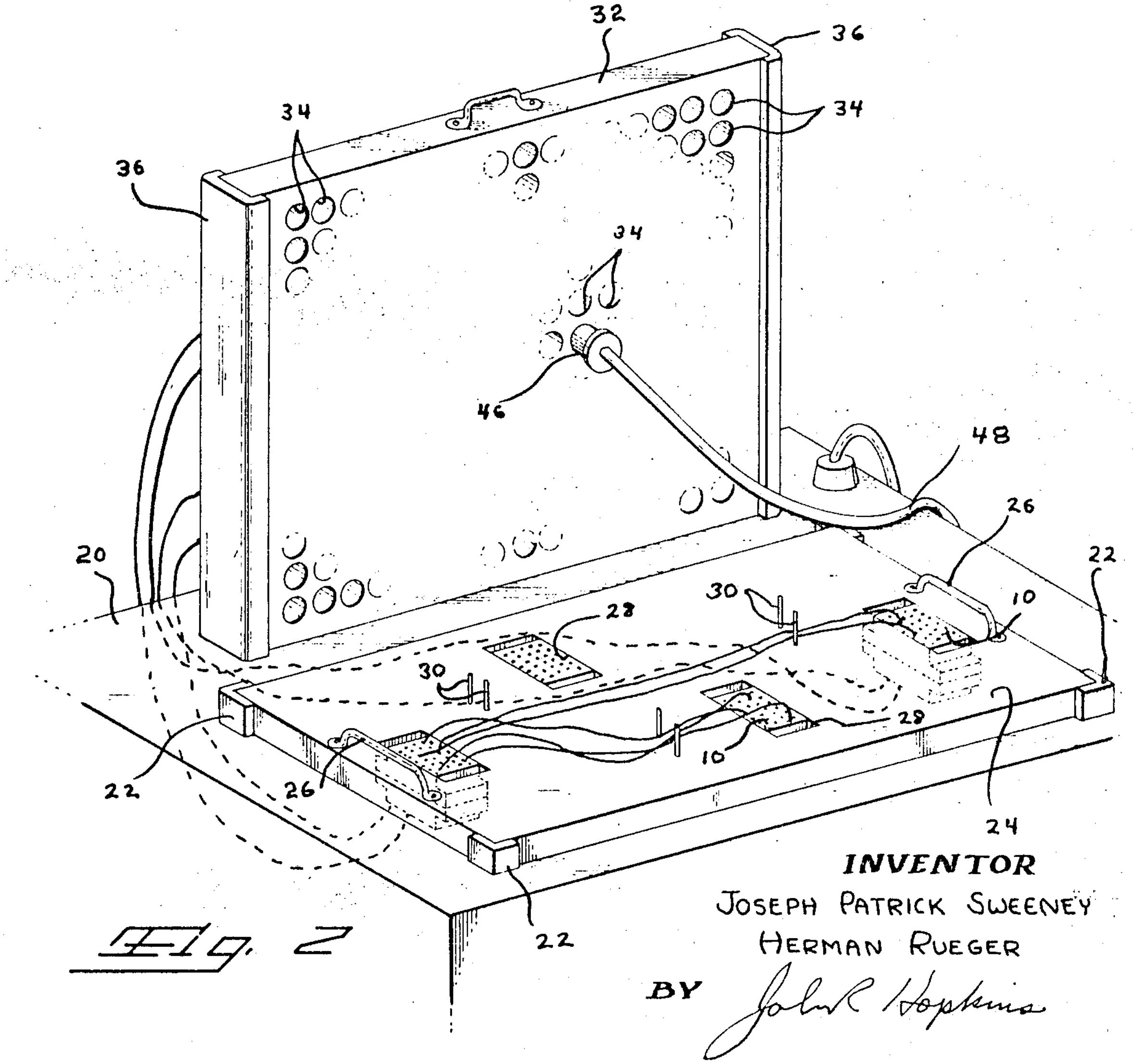
FIG. 2 is a perspective view showing the apparatus of the invention in one embodiment for use in harness making.

FIG. 2 shows an apparatus embodying features of the invention as mounted at a work station for fabricating a harness. The apparatus is mounted in a console or on a work bench surface shown as 20, having on the horizontal surface thereof a series of guides shown as 22 positioned to receive and align a removable harness making tray shown as 24. The tray includes at each end handles 26 and through the surface thereof a plurality of apertures 28 of a configuration which may preferably be complementary to a given connector geometry or design, or alternatively of a size to accommodate a family of connector sizes. In the particular example of FIG. 2 a three connector harness is laid out, one of the apertures 28 not being required for use. The harness tray 24 may, if desired, include a series of projecting pins shown as 30 which indicate a desired layout of the leads forming the harness to be fabricated. It is visualized that for a given fabrication set-up there would be provided a number of the trays 24 which, after use in the apparatus shown in FIG. 2, could be utilized to store the fabricated harness until other production steps were finished, such as taping or wrapping the bundles of wires forming the harness; tagging, inspection and the like. It is, of course, contemplated that the different types of trays might be advantageously utilized for different types of harnesses and different types of connectors. Beneath the surface of 24 mounted by some jig fixture not shown, are connector halves which mate with the connectors 10 fitted within the tray. These are shown dotted in beneath the connector blocks 10 fitted within the tray at each end thereof. It is contemplated that the jig fixture should facilitate movement of the lower blocks 10 for readily accommodating harnesses of a different configuration utilizing a given connector geometry.

Figure 4:
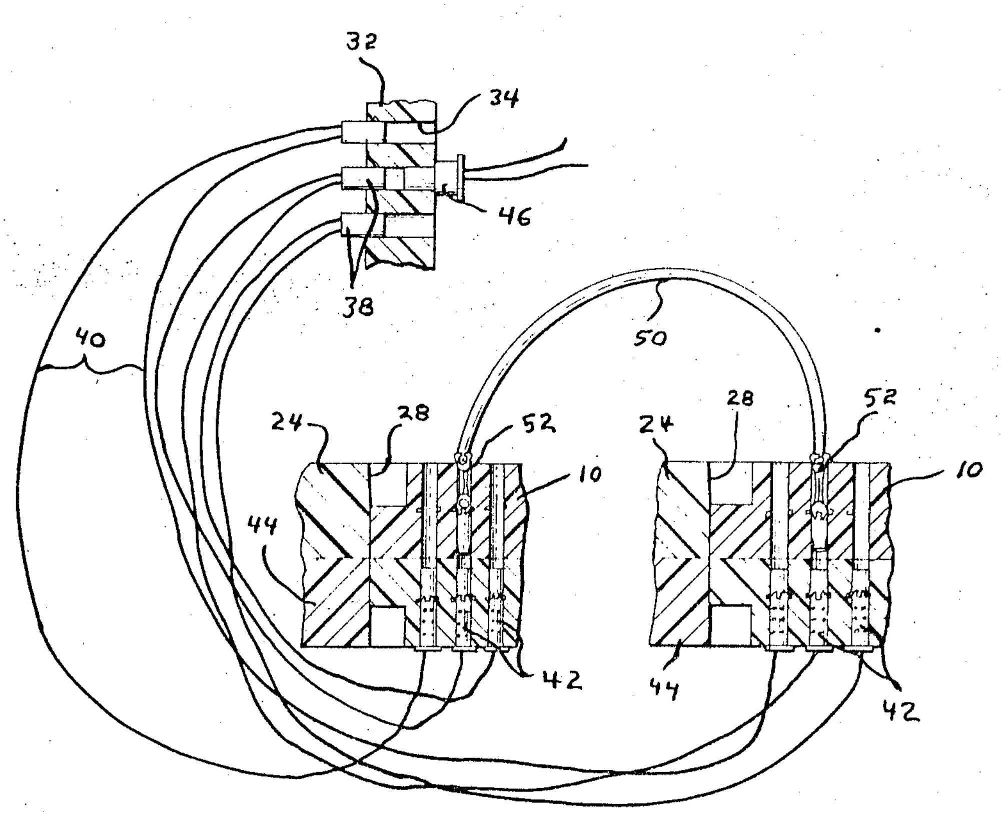
FIG. 4 is a view showing in section portions of the apparatus of FIG. 2.

Fiber optic leads are connected into the lower blocks 10 as indicated by the dotted lines and are fed around under the surface of 20 and into a panel shown as 32 which contains an array of apertures 34. The panel is slidingly held relative to 20 by channels such as 36 in a position convenient to a fabricator working at the station. FIG. 4 shows a portion of the panel 32 having the apertures 34 extending therethrough. As can be discerned, fiber optic bundle connectors shown as 38 are plugged into the rear of the panel extending inwardly for a portion of the length of the apertures 34. Preferably these connectors are snapped into the panel and latched therein by a suitable structure. The connectors may alternately be permanently affixed in the panel as by bonding with an epoxy or other adhesive. Reference is made to copending application Ser. No. 569,726 filed Aug. 2, 1966, in the name of B.C. Longnecker et al. for disclosure of a preferred connector construction for terminating fiber optic bundles in a latch assembly.

As can be discerned from FIG. 4, the connectors 38 each carry two optic bundles such as 40 each of which is carried to a separate lower block 10 and inserted through a further connector shown as 42 in such lower blocks. FIG. 4 shows a portion of the lower block positioned in a jig member 44. A portion of the tray 24 is also shown in FIG. 4 with portions of the connector blocks to be harnessed secured in the tray apertures 28 in alignment with the lower blocks 10.

Figure 3:
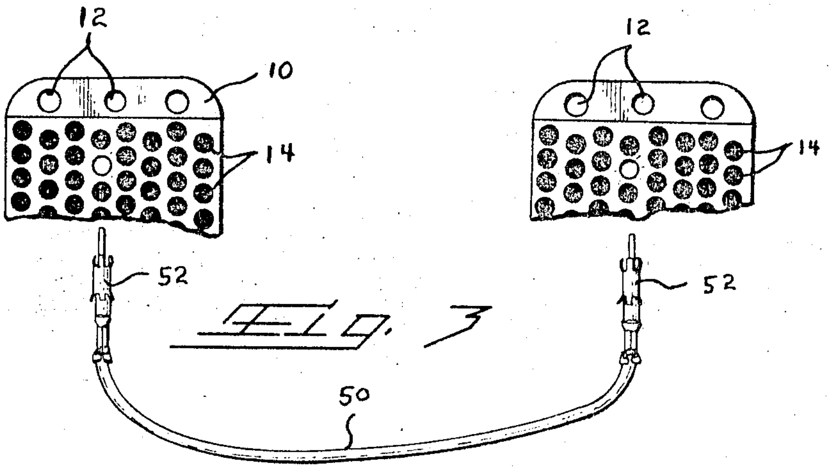
FIG. 3 is a view of portions of two connectors illustrating the advantage of the invention in the embodiment of the apparatus of FIG. 2.

Referring now to FIG. 2, the station thereshown includes a light source shown as 46 which is pluggable into the apertures 34 of the panel 32. The light source is supplied by an electrical lead 48 having sufficient scope to permit the source 46 to be plugged into any one the apertures of 34. The light source is of an intensity so that when it is plugged into an aperture 34 sufficient light is transmitted through the associated fiber optic leads to illuminate the apertures of the blocks to be harnessed. FIG. 3 is representative of visual appearance of portions of a connector to be harnessed. The selected or desired apertures illuminated contrast quite clearly with the remainder of the apertures which are relatively dark. The lead shown as 50 to be used in providing a harness between blocks 10 is preterminated at both ends by terminals shown as 52 which snap into the blocks. It is contemplated that leads for a given harness may be precut and stripped if necessary and terminated in some kind of applicator and then stacked in bundles for use in harnessing.

In accordance with the concept of the invention, a fabricator would position the tray as shown in FIG. 2, load such tray with appropriate connector blocks and then proceed in accordance with a predetermined program to plug the light source 46 into the apertures 34 in a sequence designed to facilitate harness layout. With the member 46 plugged in, associated apertures in the blocks to be harnessed would then be illuminated, the fabricator following such illumination as an identification for insertion of the terminals on a lead 50. It has been found that this approach greatly simplifies identification of proper apertures and eliminates very considerably the chance of error. It has also been found that a fabricator does not tend so much to slow down after an hour or two of fabricating with the aid of the invention nor to increase in error rate. Once the lead is inserted in the proper aperture the illumination relative to such aperture disappears. If by chance the fabricator were to, in error, insert the lead in the wrong aperture the light resulting from such illumination would continue, immediately apprising the fabricator of an insertion error.

It is contemplated that for a typical harness maker a setup like that shown in FIG. 2 could be readily modified for different types of harness and different types of connectors by providing more than one panel 32 with associated fiber optic leads terminated in the lower blocks. By removing 32 and the lower blocks and associated optic bundles and replacing such with a similar assembly the station could be very quickly modified to aid in fabrication of a different harness.

Figures 5, 6:
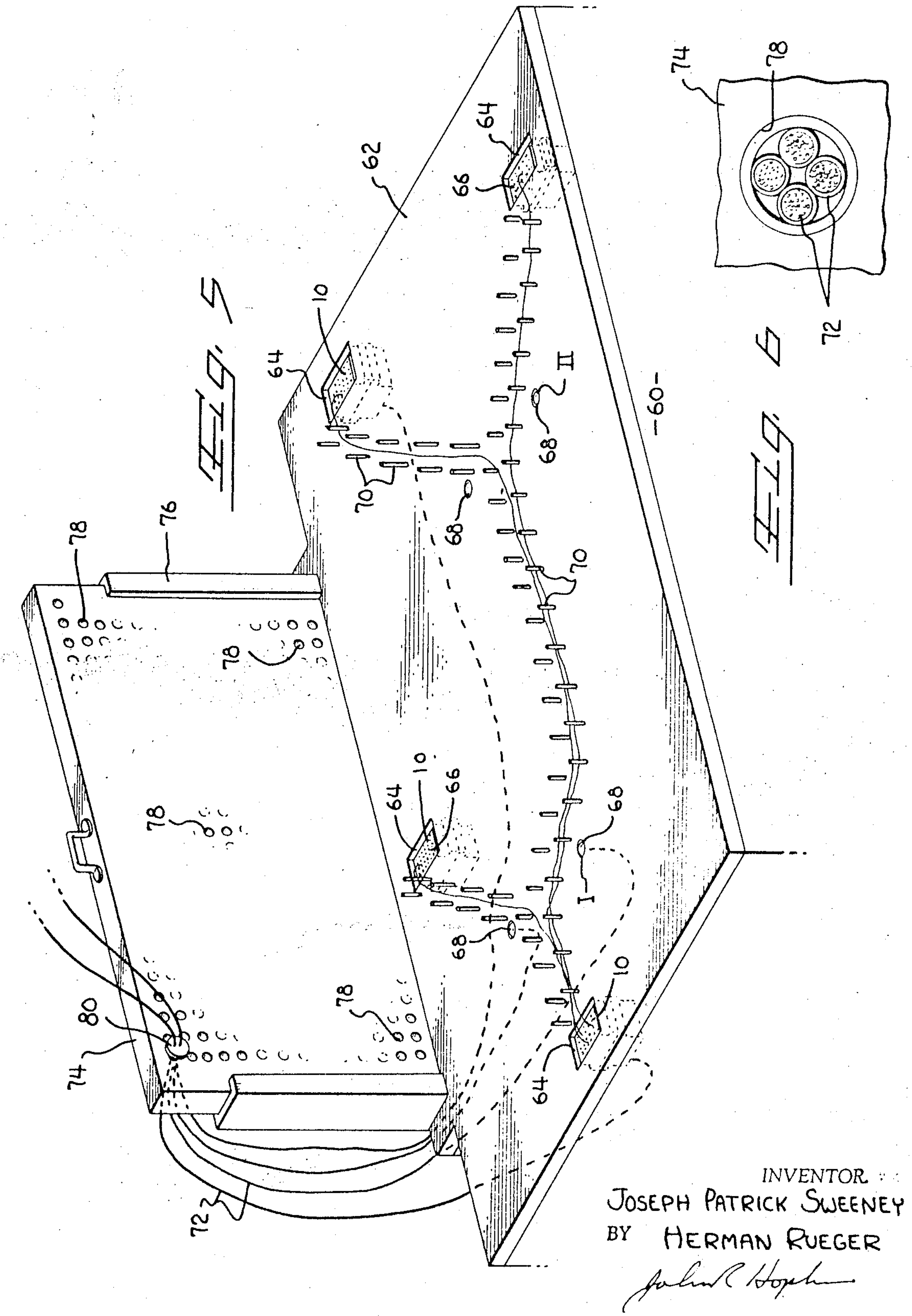
FIG. 5 is a perspective view of an apparatus in accordance with the invention similar to that shown in FIG. 2 but including in addition a light guide means for guiding wire laying in addition to wire insertion.
FIG. 6 is an end-on view of a fiber optic bundle as employed in one aspect of the invention relative to the apparatus of FIG. 5.

Turning now to FIG. 5, a further aspect of the invention is shown relative to a work station 60 including a harnessing surface 62 which might be considered as a removable panel or tray as in the previous example. The panel 62 includes a series of apertures 64 of a geometry to house connector blocks 10 for which a harness is to be provided. In addition small apertures shown as 68 are provided having therein fiber optic bundles carried in a suitable optic connector of the type heretofore described. The apertures 68 and associated optic bundles facilitate winding layout and are particularly useful with respect to harnesses of an overall span making simultaneous observation of connector blocks to be harnessed difficult if not impossible for one person. Again, posts such as 70 are provided generally defining the wiring paths for the harness.

As in the previous embodiment, lower blocks 10 are held in a position beneath the apertures 64 and are made to carry fiber optic bundles terminated therein and positioned to transmit light up through the apertures of the upper blocks 10. The fiber optic bundles shown as 72 are carried to a panel 74 held up in the work station by channels 76. A light source shown as 80 similar to that previously described is provided for insertion into apertures 78 in the panel 74. As will be appreciated by those skilled in the art, optic fibers are quite small and it is feasible to place more than one fiber or more than one bundle of fibers in the apertures 78. FIG. 6 shows a typical aperture 78 approximately twice actual size, containing four fiber optic bundles in a fiber optic connector. Each of these bundles will transmit light from the source 80 when such source is energized and plugged into the aperture 78. In accordance with the invention the plurality of optic bundles may be utilized to illuminate not only the connector blocks, but also the guide stations at 68. Thus, one of the bundles may be carried to the left hand block 10, another bundle being carried to an appropriate other block such as the right hand lower block. For this step in the harnessing procedure a third bundle would be carried to the guide site labeled I and a further bundle carried to the guide site labeled II. The fabricator upon initiating a given program step by plugging the light source 80 in a given aperture would then immediately perceive illumination in an appropriate aperture of the connector block to the left in FIG. 5, illumination at guide site I and a guide site II and illumination in the right hand block at the appropriate aperture. This means that the fabricator can start at the left and without having to look in each of the blocks to see where the lead must go to be guided toward such block. As an important aspect of the invention, fiber optic leads readily lend themselves to color coding for a number of different purposes. All that is required is that the end of the optic fiber be tinted with an appropriate dye, such as Rit, or coated with amyl acetates of an appropriate color. If, for example, in a harness where all the wires are color coded, the first program step calls for a yellow wire, the four optic bundles could all be tinted yellow so that the illumination at each site was yellow. The fabricator would immediately know to use a yellow wire. This color coding can be used to advantage for later identification of electrical leads in a harness and also for reducing time of fabrication, the different leads for different portions of the harness being given different colors.

After a harness has been completed at station 60 it may be temporarily tied and transported for final tying and storage for later use.

Figure 7:
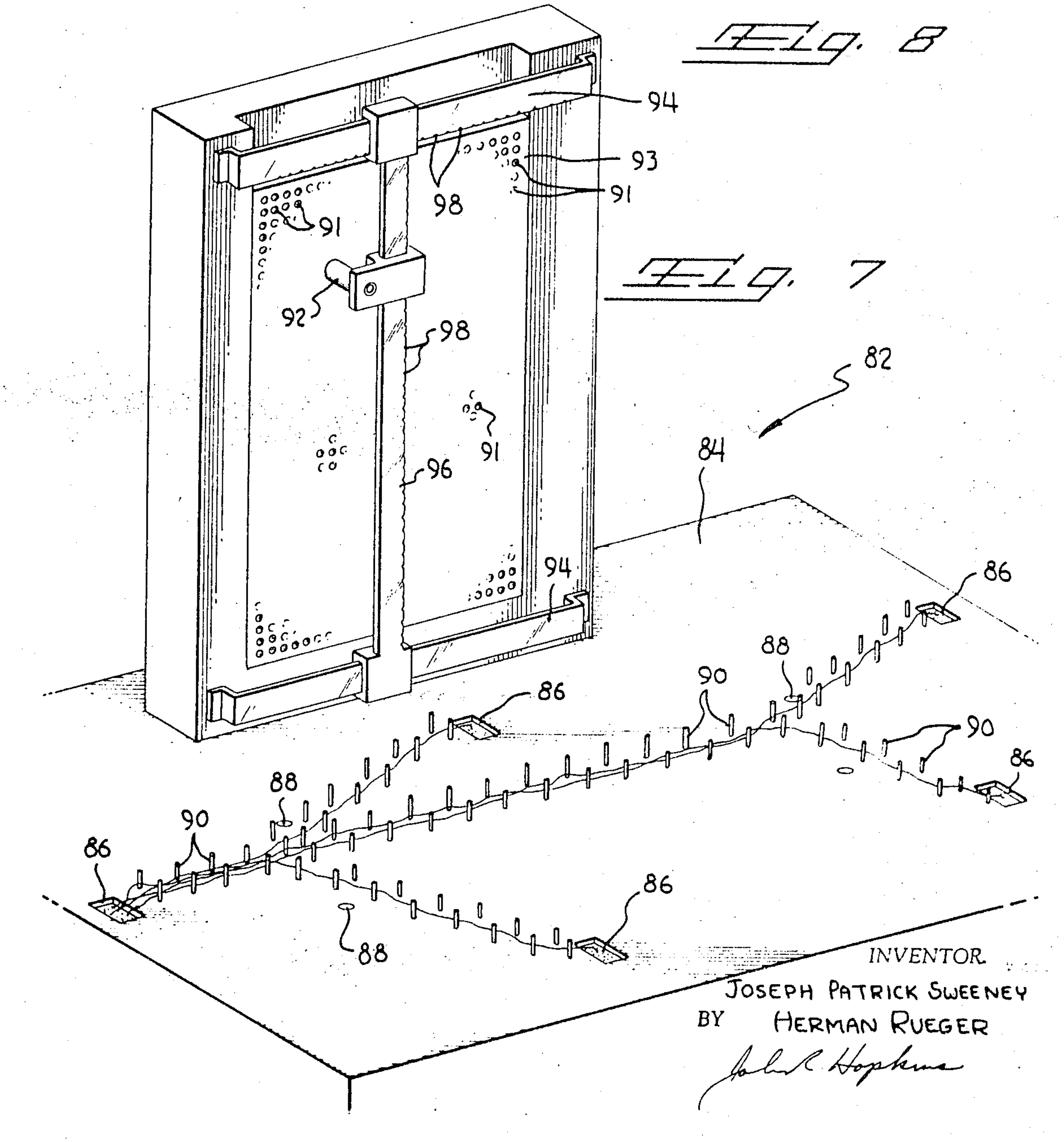
FIG. 7 is a perspective view of a harness making station including apparatus for programming harness making steps.

FIG. 7 shows a harnessing station 82 having a work surface defined by panel 84 including apertures such as 86 to accommodate connector or terminal blocks for a given harness. Also included are the guide sites shown as 88 and posts 90 for facilitating harness lead layout. Beneath the panel 84, lower connector blocks carrying fiber optic bundles may be provided as previously described. These optic bundles are, in turn, carried to a panel shown as 93 supported on the panel 84 in a position of ready access to the fabricator. In accordance with one aspect of the invention the light source shown as 92 may be carried on a frame comprised of horizontal arms 94 and a vertical arm 96. At least the upper arm 94 and the vertical arm 96 may carry indentations shown as 98 which index horizontal and vertical movement of the light source 92. The light source 92 is not plugged into the apertures 91 of the panel 93 but is made to transmit light therein with as little loss of light to adjacent apertures as is feasible. With the apparatus shown in FIG. 7, a fabricator may follow a given program by manually positioning the light source step by step through those apertures which are required to define a given program for a given harness. It is contemplated that the panel 93 may contain a sufficient number of apertures 93 to define several or even a large number of different harnesses, fiber optic bundles being carried from the apertures to different connector blocks of the same or different types which are stored in a suitable fashion beneath the surface of panel 84, the fabricator selecting appropriate ones and jigging them in beneath the apertures 86, as desired for fabricating a given harness.

In a typical use of the apparatus at work station 82 as shown in FIG. 7 the fabricator would start in a given row or column of the apertures 91 and then step the light 92 down the column or across the row inserting and laying each lead of the harness at each step of the program.

It is contemplated that the light indexing mechanism shown in FIG. 7 may be automated by the provision of means to drive the slide 96 back and forth along the slides 94 and means to drive the indicator 92 up and down on the slide 96. Such means could be in the form of a standard stepping solenoid with pulses developed from a suitable stepping switch which could be sequentially energized to step through a given program responsive to an operator controlled by push button or foot pedal. Alternatively, an automatic stepping operation could be carried out at a rate allowing adequate time for each of the steps of fabrication of a given harness relative to experience of different fabricators.

Figure 8:
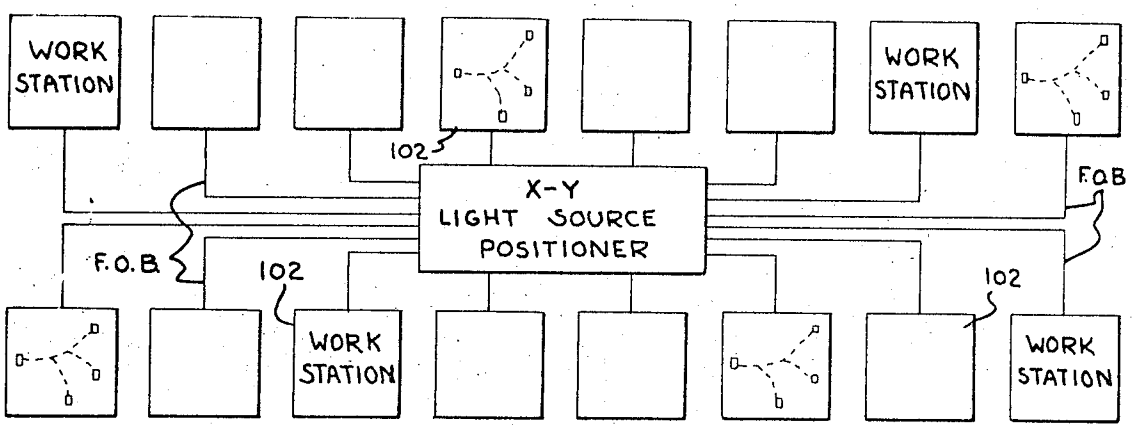
FIG. 8 is a schematic view illustrating an aspect of the invention wherein a single programming apparatus like that of FIG. 7 is utilized with multiple harness making stations.

FIG. 8 shows schematically use of the invention in fabrication of more than one harness at a time. The numeral 100 represents an X–Y light source programmer which may be like that shown relative to the station 82 in FIG. 7. Some sixteen work stations shown as 102 are provided and are connected by fiber optic bundles to the programmer 100. Each of the work stations may be considered to contain appropriate panels housing connector blocks for harnessing operations. In the manner previously described a relatively large number of fiber optic bundles can be placed in a given aperture in the light source panel. It is contemplated that all of the work stations may be used simultaneously and would therefore carry identical patterns of connectors each carrying identical patterns of optic bundles so that each step of a program carried out by the programmer 100 could be followed simultaneously at each of the work stations. A single person might be responsible for operating or checking the operation of the programmer 100 with a number of persons utilized to carry out the harnessing at the various work stations. It is contemplated that a set-up like that shown in FIG. 8 might be employed wherein one type of harness would be made to occupy four or five of the stations with the remaining stations set-up for other types of harnesses and the programmer made to be run through a first program for one harness and then a later program for another harness.

Figure 9:
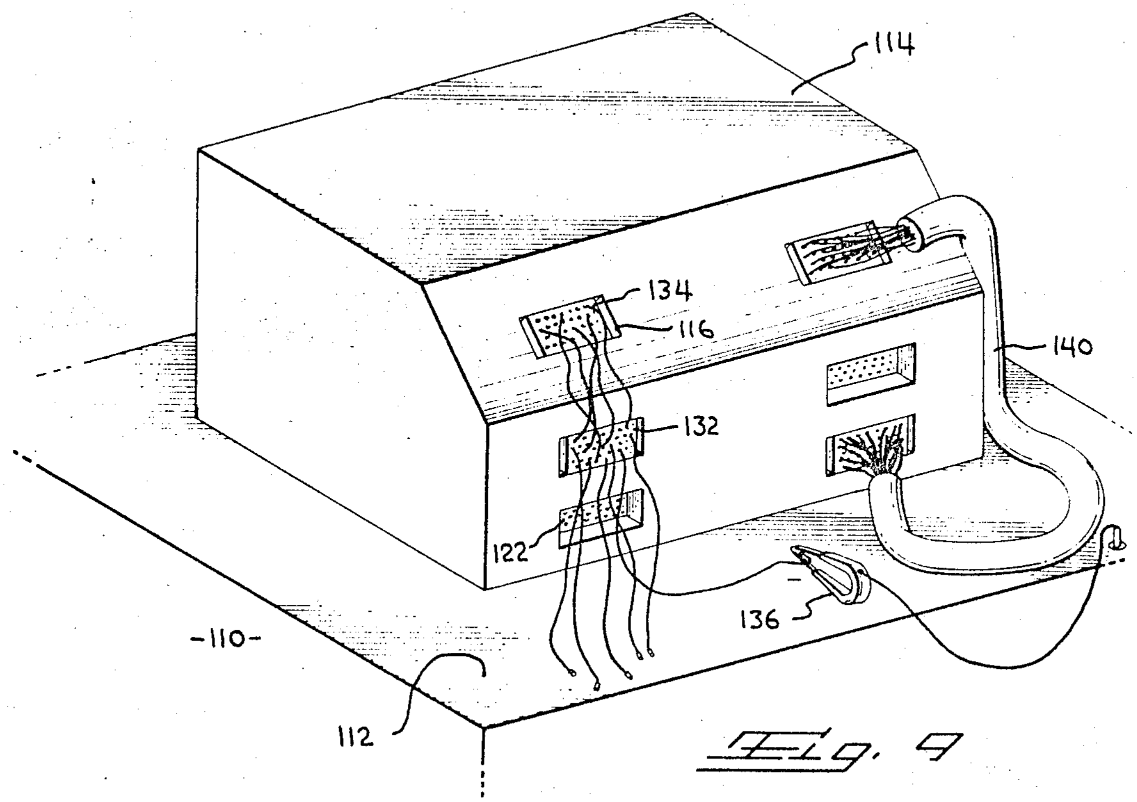
FIG. 9 is a perspective view showing an apparatus in accordance with the invention in another aspect which may be utilized for either harness making or harness repair and alteration as well as checking.
Figure 10:
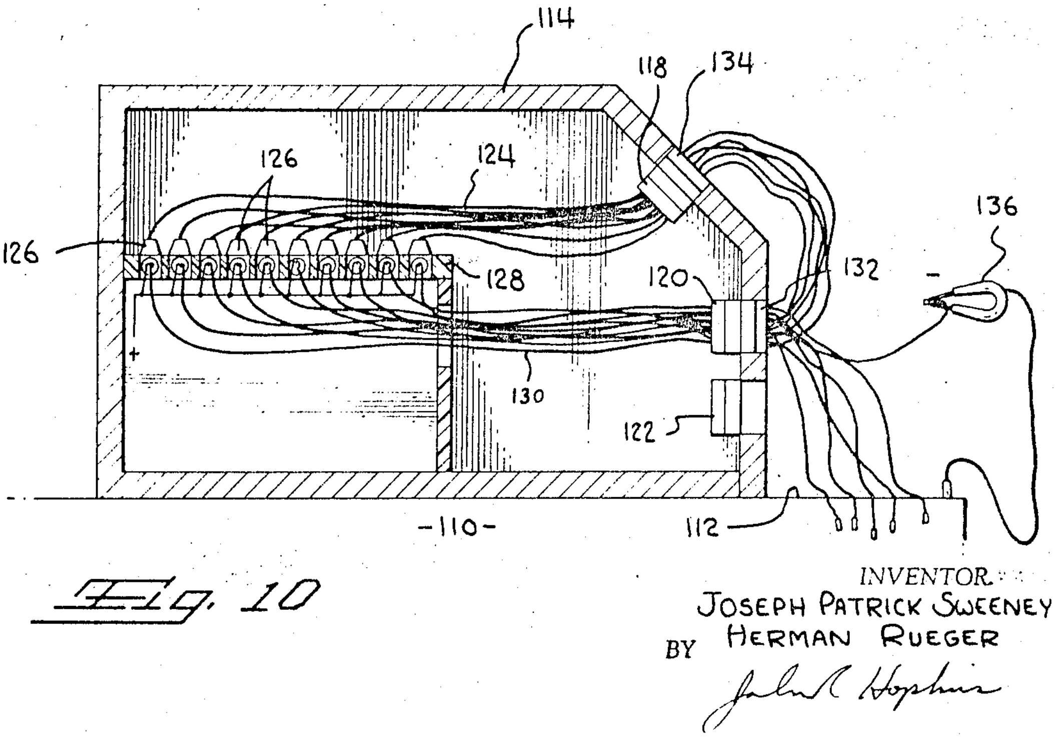
FIG. 10 is a sectional view of the apparatus shown in FIG. 9.

Referring now to FIGS. 9 and 10 a further aspect of the invention is disclosed relative to a work station identified as 110. A work surface 112 carries an apparatus identified as 114 which contains in the front surface thereof a series of apertures shown as 116 within which are fitted connector blocks of the type to be utilized in a harness or fabrication. These blocks are identified as a block 118 shown in FIG. 10, located in behind the beveled portion of 114 and a block 120 located in behind the vertical portion of 114. The block 120 may represent a given half of a connector block assembly such as a left hand or a right hand half with there being provided adjacent to connector block 120 an opposite block half shown as 122. In accordance with the aspect of the invention revealed in FIG. 9 and FIG. 10, the upper block 118 contains a series of fiber optic bundles 124 each terminated to a light source carried in a panel 128, there being one light source 126 for each lead 124 and for each aperture in block 118. These light sources may be plugged into apertures in the panel 128 in the manner previously described relative to the single light source. Each of the light sources includes two terminals, one of which is connected to an electrical lead such as those shown as 130, in turn terminated in the lower block 120. The other terminals of all of the bulbs are connected in common to a suitable low voltage source such as a 6 volt battery supply or output from an appropriate transformer. In accordance with the invention the blocks to be harnessed which are represented as 132 and 134 in FIGS. 9 and 10 are plugged into the blocks 118 and 120 so that the apertures thereafter are in alignment. The block 132 is first filled indiscriminately with terminals connected to the leads forming the harness. These leads are laid out as indicated in FIG. 9. Then, the leads are picked up one at a time and grounded as by a tool indicated as 136 having a connection to ground; or by a conductive glove, not shown, also connected to ground. Upon grounding of the free end of the lead a path will be closed through an associated electrical lead 130 to the associated lamp 126 causing such lamp to be lighted. This will, in turn, cause light to be transmitted through an associated fiber optic bundle 124 in turn transmitting light from 118 through an associated aperture in the block 134. The fabricator may then insert the selected end of the lead and terminal in the block 134. In this manner a harness may be fabricated utilizing the light optic guide and aid provided by the invention apparatus. In practice it would be preferable to arrange the pattern of insertions so that the connector 134 would be filled from the bottom leaving the next apertures to be filled exposed so that the illumination could be readily discerned by the fabricator and not covered over by previously inserted leads.

FIG. 9 also shows a further use of the invention relative to a prejacketed cable and harness shown as 140. Prejacketed harnesses may be made up with precut lead lengths terminated by application tooling and cabled or tied in a suitable fashion. With the invention apparatus it is only necessary to then insert all of the terminals of one end of the harness into the connector block and then one at a time, picking up the terminals of the other end of the harness, follow the illumination pattern provided to complete the harness.

The apparatus of the invention may also be used for replacement or repair. In the event a connector is not completely filled, the harness may be plugged in with additional leads being inserted in properly identified positions. If leads are to be replaced the harness may be plugged in with the illumination becoming visible only if the right lead is removed. In this latter use, illumination to identify the lead to be replaced will not, of course, locate. It will, however, serve to verify.

It should also be apparent from the foregoing disclosure that placing of components or parts other than electrical harness leads is contemplated. For example, the invention may be used to insert the leads of components such as resistors or the like or of integrated circuit modules or even of non-electrical components. The capability of color coding enhances the use of the invention apparatus in general assembly procedure.

While the invention in one aspect features the use of light transmitting members in the form of fiber optic bundles a major aspect thereof contemplates directing light as described apart from a particular channeling medium. Furthermore the use of the term light is intended to cover radiation both on the visual spectrum and above or below the visual spectrum; in which event a suitable detecting means would be additionally employed.

It is also contemplated that the invention may be utilized in a form wherein some light sensing mechanism is employed in lieu of or in addition to an operator.

That is to say that the invention in one aspect contemplates sensing of the presence and cessation of light in an aperture into which some element is inserted. In a broad sense the invention in one aspect relates to providing instructions which may be followed by an operator or fabricator to execute a series of manipulations. The physical array of light transmitting members forms that part of the apparatus which serves as a storage medium.

Having now disclosed the invention in terms intended to enable preferred practice thereof we define what is asserted as inventive to the appended claims.

We claim:

1. In a method of making harnesses comprised of at least two connector halves each including a plurality of apertures into which a series of electrical leads must be inserted in a selected pattern to form a harness, the steps comprising:
- providing mating connector halves for said halves to be harnessed and positioning said halves to be harnessed on said mating halves with respective apertures therein in axial alignment,
- providing an array of light transmitting members,
- positioning first ends of said members within respective apertures of said mating connector halves,
- grouping second ends of said light transmitting members for respective connector halves for selective common illumination of the same,
- selectively illuminating the second ends of a given group of said light transmitting members to illuminate given apertures in each connector half to be harnessed, and
- inserting ends of a lead into the illuminated apertures of each connector half to be harnessed,
- whereby, cessation of light from said apertures acts as a verification of proper lead connection between connector halves.

2. The method of claim 1 wherein said step of providing a light transmitting member for each aperture includes providing an auxiliary light transmitting member having a first end terminating in a position to properly indicate a particular connector half to be lead connected and grouping the second end thereof commonly with the second ends of said light transmitting members to be commonly illuminated by said light source, whereby said auxiliary light transmitting member acts as an auxiliary indicator.

3. A method of connecting leads to blocks, comprising the steps of:
- providing a panel with a plurality of apertures,
- connecting an unilluminated light transmitting member between each of the apertures of said panel and a corresponding aperture of a first block,
- connecting another unilluminated light transmitting member between each aperture of said panel to a corresponding aperture provided in at least one other block,
- illuminating a selected single aperture of said panel and the light transmitting members associated with said illuminated aperture,
- transmitting the illumination by said transmitting members to at least one corresponding aperture in each of said blocks, and
- connecting an electrical lead between the illuminated apertures of said blocks, thereby to provide a conduit between said blocks.

4. A method of connecting electrical leads between blocks, comprising the steps of:
- providing an apertured first block with a plurality of electrical leads connected to respective apertures,
- electrically connecting each electrical lead of said first block to an unilluminated light source,
- connecting said light source to a power source,
- providing an unilluminated light transmitting optical path member from the light source to a selected aperture of at least one other block,
- mechanically grasping a selected electrical lead of said first block by an electrically conducting tool electrically connected to said power source, thereby completing an electrical circuit between said power source and said light source and illuminating said light source,
- transmitting illumination from said light source over said discreet optical path to illuminate a selected aperture of said other block, and
- using said tool to insert said mechanically grasped electrical lead into the illuminated aperture of said other block, thereby providing an electrical path between said blocks.

* * * * *